US005928455A

United States Patent [19]

Dizin et al.

[11] Patent Number: 5,928,455

[45] Date of Patent: Jul. 27, 1999

[54] METHOD OF MAKING AN ELECTRICAL CONNECTION BY GLUING A RIGID TERMINAL TO A CONDUCTIVE TRACK, RIGID TERMINAL FOR USE IN THE METHOD AND APPLICATION TO A HEATING RECEPTACLE HEATING PLATE

[75] Inventors: Martine Dizin, Vallieres; Henri Piera, Rumilly; Michel Sarrazin, Massingy; Jacky Veniat, Rumilly, all of France

[73] Assignee: SEB S.A., Ecully Cedex, France

[21] Appl. No.: 08/797,762

[22] Filed: Feb. 7, 1997

[30] Foreign Application Priority Data

| | | | |
|---|---|---|---|
| Feb. 9, 1996 | [FR] | France | 96 01636 |
| Jun. 6, 1996 | [FR] | France | 96 06997 |

[51] Int. Cl.$^{6}$ ..... B32B 31/00

[52] U.S. Cl. ..... 156/276; 29/842; 156/87; 156/304.3; 439/78; 439/83

[58] Field of Search ..... 156/66, 87, 244.25, 156/276, 331.1, 304.3, 157; 338/322; 439/83, 84, 78, 876; 29/842; 264/274

[56] References Cited

U.S. PATENT DOCUMENTS

| | | | |
|---|---|---|---|
| 2,709,211 | 5/1955 | Glynn | 439/83 X |
| 2,787,693 | 4/1957 | Razlag | 439/80 |
| 3,119,172 | 1/1964 | Mazenko et al. | 29/829 |
| 4,023,008 | 5/1977 | Durussel | 219/522 |
| 4,537,461 | 8/1985 | Ouellete | 439/83 |
| 4,719,317 | 1/1988 | Reynolds et al. | 174/94 R |
| 4,923,552 | 5/1990 | Fukushima et al. | 156/273.7 |
| 5,006,143 | 4/1991 | Kawase et al. | 65/43 |
| 5,411,720 | 5/1995 | Dennis | 439/83 X |

FOREIGN PATENT DOCUMENTS

| | | |
|---|---|---|
| 0299868 | 1/1989 | European Pat. Off. . |
| 0329421 | 8/1989 | European Pat. Off. . |
| 1277657 | 10/1961 | France . |
| 2692426 | 12/1993 | France . |
| 9519691 | 7/1995 | WIPO . |

OTHER PUBLICATIONS

French Search Report (2 pages) FA524388 FR 9601636.
French Search Report (2 pages) FA529142 FR 9606997.

*Primary Examiner*—Francis J. Lorin
*Attorney, Agent, or Firm*—Young & Basile, P.C.

[57] ABSTRACT

A method is disclosed of making connections by gluing terminals or like components to a resistive track for a heating plate. A terminal for use in this method is also disclosed. Fine lamellae are cut out from one or more areas of the base of the terminal, which is coated with a conductive resin. The conductive resin is then dried and cross-linked to glue the terminal to the resistive track. During this step, the lamellae serve as drains to evacuate the bubbles of gas that form. Applications include heating plates for kettles or similar heating receptacles.

27 Claims, 2 Drawing Sheets

METHOD OF MAKING AN ELECTRICAL CONNECTION BY GLUING A RIGID TERMINAL TO A CONDUCTIVE TRACK, RIGID TERMINAL FOR USE IN THE METHOD AND APPLICATION TO A HEATING RECEPTACLE HEATING PLATE

BACKGROUND OF THE INVENTION

1. Field of the Invention

The invention concerns a method of making an electrical connection by gluing a rigid terminal to a conductive track.

It also concerns a rigid terminal for use in the method.

It applies in particular, although not exclusively, to making electrical connections for a heating plate or for a heating receptacle, in particular for a kettle.

2. Description of the Prior Art

One example of a heating plate is described in French patent application FR-A-2 692 426. A heating plate of this kind includes a metal support on top of which is a vitreous layer in turn supporting a resistive track. The latter is advantageously deposited by the silkscreen process and forms a heating element.

A heating plate of this type has many advantages. Firstly, it is particularly well suited to heating a kettle. It is easy to clean, which is also advantageous from the hygiene point of view, and offers high thermal efficiency. Because it is thin, it is easily disposed within a kettle.

In the above patent application, the electrical connections to the ends of the resistive track are glued, using a conductive material, as shown in particular in FIG. 3 of the application. To this end, a metal wire or tongue is embedded in a drop of conductive resin deposited on the conductive track. The resin is then dried and cross-linked.

For some specific applications it would appear desirable to use rigid metal terminals or similar devices rather than to glue the electrical wire directly to the resistive track. In particular, this method facilitates demounting of the plate, by disconnecting the power supply electrical wires, these wires being terminated by terminals complementary to the terminals glued to the resistive track.

Gases are generated during the drying and cross-linking of the resin. For gluing the terminal to the resistive track it is necessary to promote the flow of gas. Otherwise gas bubbles form under the solid surfaces of the terminals. These gas bubbles are trapped and make the contacts fragile, both mechanically and electrically.

However, we have found that the flow of the gases produced by drying and cross-linking the resin is satisfactory when stranded electrical wires are glued directly to the resistive tracks. This flow occurs under particularly good conditions if the diameter of the strands is in the range from 0.2 mm to 0.8 mm.

However, it is difficult to make a connection to a flexible electrical wire.

SUMMARY OF THE INVENTION

The method of the invention for making a glued electrical connection using an electrically conductive glue comprises at least the following steps:

a) forming at the end of an electrically conductive material terminal an area formed of strands or lamellae;

b) covering this area formed of strands or lamellae with said electrically conductive glue; and c) applying said area to a conductive material layer to effect said gluing.

In a first version of the invention, the method comprises at least the following steps:

a) inserting a segment of stranded electrical wire into an orifice in an electrically conductive material terminal;

b) covering this segment of stranded electrical wire with said electrically conductive glue; and c) applying the combination of the segment of electrical wire and the terminal to a conductive material layer to effect said gluing.

In a second version of the invention, the method comprises at least the following steps:

a) making a series of lamellae in at least one substantially plane area of a rigid terminal made from an electrically conductive material;

b) covering this area provided with said lamellae with said electrically conductive glue; and c) applying the area provided with the lamellae to a conductive material layer to effect said gluing.

The invention also consists in an electrical connection made in this manner.

The invention further consists in an application to a heating plate for a heating receptacle, in particular for a kettle.

The invention will be better understood and other features and advantages will emerge from a reading of the following description given with reference to the accompanying drawings.

DETAILED DESCRIPTION OF THE PREFERRED EMBODIMENTS

The following description refers to the preferred application, i.e. to making connections for a heating plate for a heating receptacle, of the kettle or similar type.

Figure 1:
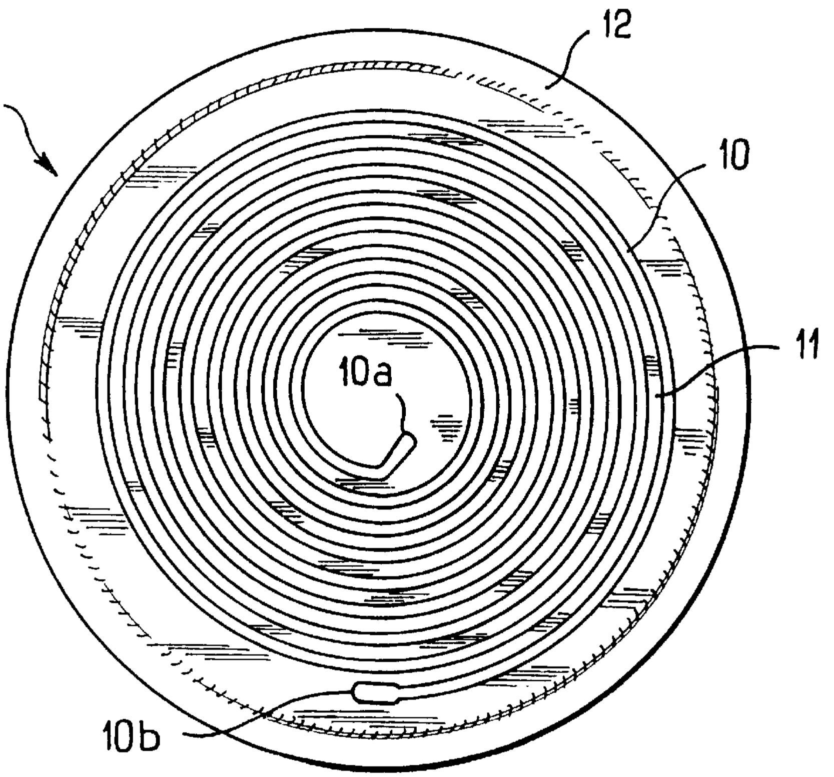
FIG. 1 shows one example of a heating plate incorporating a resistive track.

FIG. 1 is a diagrammatic bottom view of one example of a heating plate 1. The latter comprises a thick, usually circular metal support 12 covered with an electrically insulative vitreous layer 11. A resistive track 10 comprising a vitreous base charged with metal particles is applied to the latter layer, advantageously by the silkscreen process. The track 10 has a spiral shape and its ends 10*a* and 10*b* are adapted to be connected to an electrical power supply.

To make the example more concrete, the thickness of the vitreous layer 11 is at least equal to 300 μm and preferably equal to approximately 400 μm. The thickness of the resistive track is typically between 8 μm and 30 μm. For a more detailed description of this embodiment of a heating plate 1 reference may usefully be had through the previously mentioned French patent application FR-A-2 692 426.

As described in the above patent application, the electrical connections to the power supply wires are made by gluing the latter directly to the respective ends 10*a* and 10*b* of the resistive track using a conductive resin.

If the intention is to glue on rigid terminals rather than directly gluing on the electrical wires or metal tongues the problem previously mentioned arises, namely the formation of gas bubbles trapped under the solid surfaces of the terminals. The gas bubbles have the undesirable effect of making the contacts fragile, both mechanically and electrically.

The method in accordance with the invention of making an electrical connection by gluing a terminal to a conductive track will now be described with reference to FIGS. 2 and 3.

Figure 2:
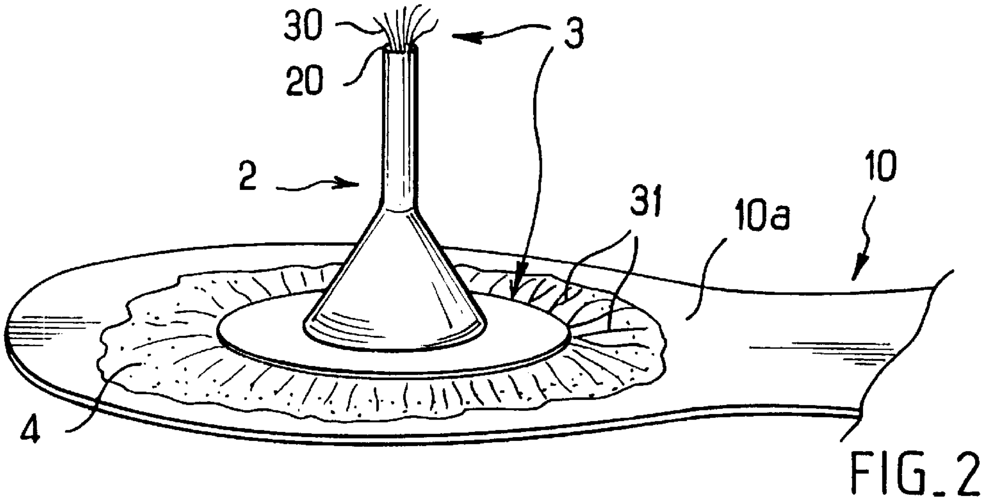
FIG. 2 shows one example of a connection made in accordance with the invention using a terminal in the form of a rivet.

FIG. 2 shows a first embodiment of a connection using a terminal in the form of a rivet 2.

Figure 3:
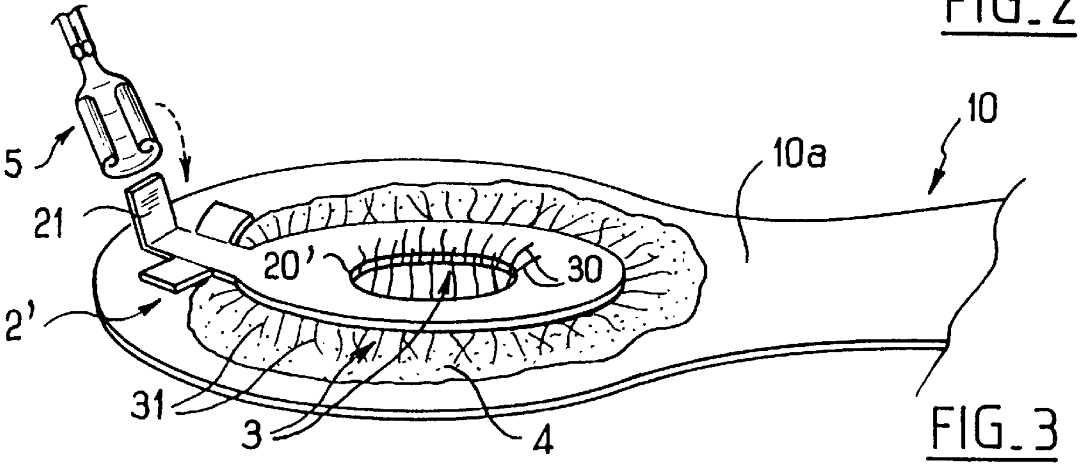
FIG. 3 shows one example of a connection made in accordance with the invention using a terminal in the form of a washer.

FIG. 3 shows a second example of a connection using a terminal in the form of a washer 2'.

In both cases, and in accordance with an important feature of the invention, the method of the invention includes a first step during which a first end 30 of a segment of stranded electrical wire 3 is threaded either into the neck 20 of a rivet 2 or into the central orifice 20, of a washer 2'. The other end 31 is disposed under the rivet 2 or the washer 2' and the strands of this end exit in a divergent peripheral bundle.

The electrical wire 3 is advantageously made up of copper strands the diameters of which are preferably in a range from 0.2 mm to 0.8 mm.

In a second step the stranded wire 3 is coated with a thermostable conductive resin 4.

One non-limiting example of a resin that can be used is a polyimide resin charged with silver, for example "CEMOTA HT 100" resin sold under the trade mark "CEMOCLA".

In a subsequent step, the resulting combination is applied to the resistive track 10, to be more precise to one or other end of the conductive track, for example the end 10*a*, as shown in FIGS. 2 and 3. In a manner that is conventional in itself, a drying and cross-linking cycle is then carried out, its precise characteristics (time, temperature, etc) depending on the type of glue used and being indicated by the supplier.

The strands, and in particular the strands 31 between the solid surfaces of the terminal and the resistive track 10, serve as "drains" that evacuate the gas bubbles which form during this step.

After the cross-linking step, the connector obtained in this way is ready to receive any appropriate connection system, such as a plug-in terminal 5 (of the type designed to push onto a tab 21 on the terminal 2', for example), a crimped connection, etc.

A reading of the foregoing description shows clearly that the invention achieves the stated objectives.

Whilst retaining the advantages of a connection using a stranded electrical wire glued to the resistive track (including high mechanical strength and good quality electrical contacts), it also provides the advantages associated with the use of rigid terminals.

However, it must be understood that the invention is not limited to the embodiments specifically described with particular reference to FIGS. 2 and 3.

Firstly, other terminal designs can be used, the structures in the form of a rivet 2 or a flat washer 2' having been described only to give a more concrete idea of the invention. Terminals in the form of eyelets may be used, for example.

Other types of conductive glues may also be used. The materials that can be used are essentially dependent on the specific intended application and constitute a simple technological choice that will be evident to the person skilled in the art.

The method in accordance with the invention for making an electrical connection by gluing a terminal to a conductive track will now be described with reference to FIGS. 4 through 7.

Figure 4:
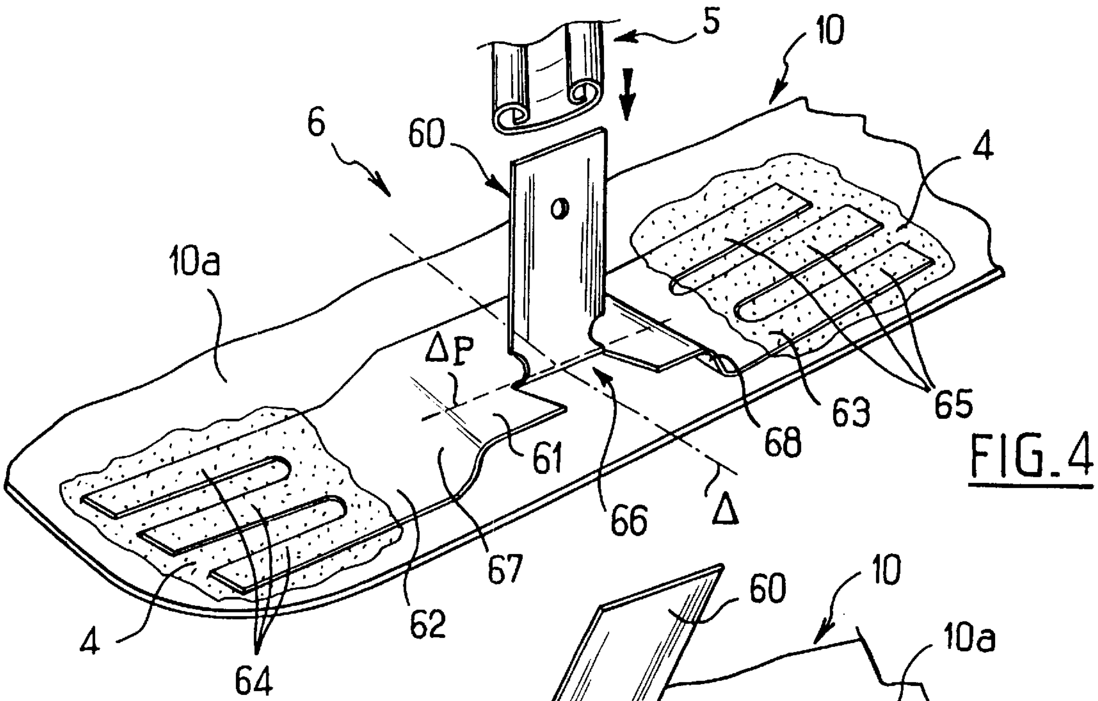
FIG. 4 shows one example of a rigid terminal adapted to be glued to a track constituting a preferred embodiment of the invention.

In particular, FIG. 4 shows one embodiment of a rigid terminal to be glued to a track constituting a preferred embodiment of the invention.

In what follows, parts common to FIG. 2 are identified by the same reference numbers and are described again only as and where required.

In this embodiment the terminal 6 is symmetrical about an axis Δ passing through its central area. In the example described it is assumed that this axis is substantially perpendicular to the track 10 and in the end area 10*a* of the latter.

It comprises a central area 61 raised relative to the surface 10*a* of the track 10, two lateral wings 63 and 64 and a substantially vertical central blade 60. The latter forms the terminal proper, by means of which the connection is made. A female terminal 5 may be pushed onto it, for example.

In accordance with one of the main features of the invention, the lateral wings 62 and 63 have cut-outs, for example at their ends, forming a series of fine lamellae 64 and 65, respectively. In the FIG. 3 example, each wing 63 and 64 comprises three such lamellae.

These lamellae 64 and 65 have the same function as the copper strands 3 in FIG. 2, i.e. they function as "drains".

The gluing to the surface 10*a* of the track 10 is effected in an entirely similar manner to that previously described, using a thermostable conductive resin 4 which coats the lamellae 64 and 65. There is therefore no utility in describing this step of the method again. In a manner that is conventional in itself, a drying and cross-linking cycle is then carried out, the precise characteristics (time, temperature, etc) of which depend on the type of glue used and are indicated by the supplier.

The fine lamellae 64 and 65 evacuate the gas bubbles that form during this step. The surface area defined by the lamellae 64 and 65 must be sufficiently large to achieve good adhesion of the terminal to the surface 10*a* of the track 10.

To obtain this advantageous effect, as already indicated, it is necessary for the lamellae to be sufficiently fine. The width of the lamellae 64 and 65 is typically less than or equal to 1 mm. The metal stock used does not differ in any way from that of prior art terminals: it may be nickel-plated steel, brass or copper, for example.

The terminal 6 of the invention has further advantageous features. The vertical blade 60, by means of which the connection is made, is preferably bent about an axis Δp such that the latter is coincident with the pivot axis of the blade 60 relative to the base of the terminal 6. It follows that the terminal may be applied in a stable manner to the surface 10*a* of the trick 10, in particular on passing through the oven to cross-link the resin. This feature facilitates automation of the method.

Furthermore, as already indicated, the central area is raised relative to the surface 10*a* of the track 10. It forms a bridge with inclined flanks 67 and 68. This geometrical feature serves to stiffen the base of the terminal 6.

Finally, providing the terminal 6 with a cut-out 66 adjacent the blade 60 limits the effects of any expansion. Such expansion may occur in the preferred application of the invention because the track 10 is a resistive heating element. The cut-out is usually obtained automatically since the blade 60 is generally made by cutting it out from strip stock and bending it.

Although the structure of the rigid terminal 6 just described is particularly advantageous, in particular because of its symmetry, many configurations are equally feasible.

Three further embodiments of rigid terminals to be glued in accordance with the invention to a track will now be described with reference to FIGS. 5 through 7.

These three structures have in common the general shape of the letter "L".

Figure 5:
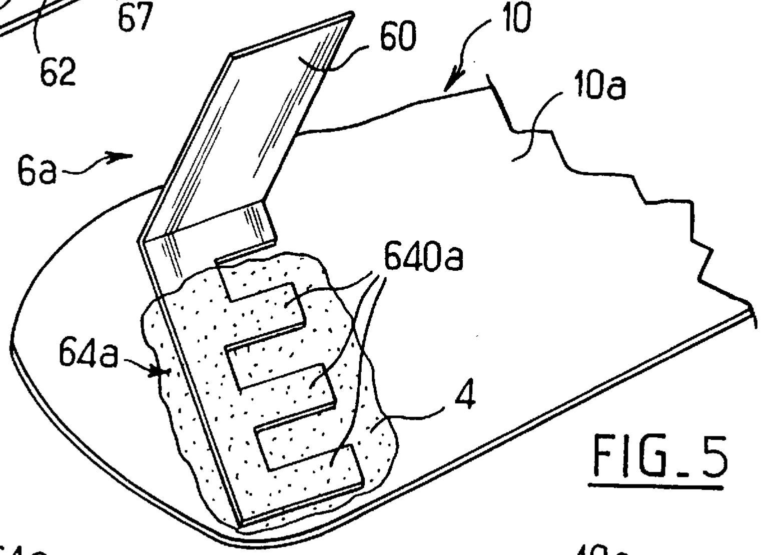
FIGS. 5 through 7 show other examples of a rigid terminal adapted to be glued to a track constituting further embodiments of the invention.

The terminal 6*a* shown in FIG. 5 has a vertical blade 60 by means of which the connection is made and a single wing 64*a*, obtained by bending at 60°, for example, to stabilize the gluing tongue which, in accordance with the main feature of the invention, incorporates fine lamellae 640*a* obtained by cutting. The lamellae 640*a* are parallel to the surface of the blade 60.

Figure 6:
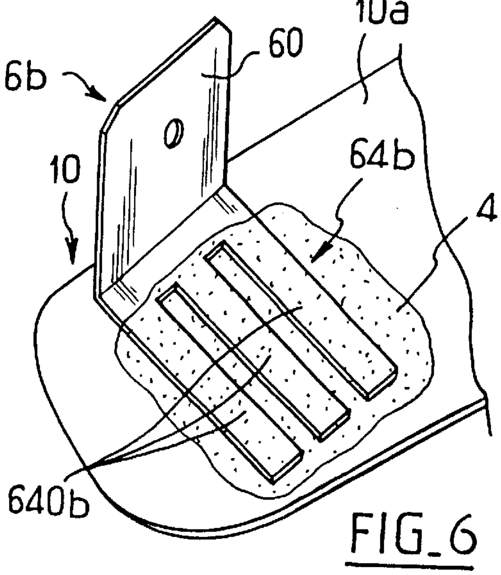

The terminal 6*b* shown in FIG. 6 also has a blade 60 by means of which the connection is made and a single wing 64*b*, obtained by bending. In accordance with the main feature of the invention, the latter includes fine lamellae 640*b* obtained by cutting. The only noteworthy difference is that these lamellae 640*b* are orthogonal to the surface of the blade 60.

Figure 7:
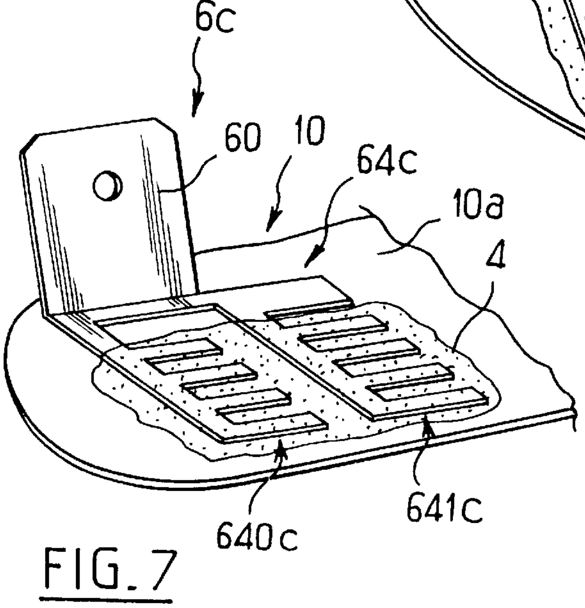

Finally, the terminal 6*c* shown in FIG. 7 has a structure similar to that of FIG. 4, in the sense that the lamellae are oriented so that they are parallel to the surface of the blade 60. However, the wing 64*c* forming the base of the terminal 6*c* is split into two parts and comprises respective series of lamellae 640*c* and 641*c*.

This arrangement has the advantage of a larger gluing area, improved stability and, because of the increase in the number of lamellae, improved evacuation of gas bubbles. It therefore lends itself more readily to the production of a terminal in which the blade 60 is inclined rather than vertical.

A reading of the foregoing description shows clearly that the invention achieves the stated objectives.

The above version of the invention simplifies the gluing method and makes it more "industrial". In particular, it is no longer necessary to use an extraneous member (the segment of stranded electrical wire). Furthermore, the terminals are neither more complex nor more costly to manufacture than terminals of the prior art. The lamellae can be cut out at the same time as the conventional parts of a terminal. The materials used are no different than those of the prior art.

Of course, the invention is not limited to the embodiments specifically described with particular reference to FIGS. 4 through 7.

Firstly, other designs of terminal may be used, for example terminals in the form of rivets (like that shown in FIG. 2), in the form of flat washers or in the form of eyelets. All that is required is for the base of the terminal to have at least one area provided with fine lamellae.

Other types of conductive glue may also be used. The materials that can be used are essentially dependent on the specific intended application and constitute a simple technological choice that will be evident to the person skilled in the art.

Although particularly well suited to making connections to heating plates, in particular kettles, the invention is not limited to this type of application alone. It applies equally well to making glued connections of terminals of any kind to a resistive material track using a conductive resin or, more generally, a conductive glue.

There is claimed:

1. The method of making a glued electrical terminal connection using an electrically conductive glue comprising at least the following steps:

a) inserting a segment of stranded electrical wire into an orifice in an electrically conductive material terminal;

b) covering said segment of stranded electrical wire with said electrically conductive glue; and c) applying said combination of said segment of electrical wire and said terminal to a conductive material layer to effect said gluing.

2. The method claimed in claim 1 wherein said segment of electrical wire is of copper and comprises strands having a diameter in a range from 0.5 mm to 0.8 mm.

3. The method claimed in claim 1 wherein said glue is an electrically conductive thermostable resin and said method includes a further step of drying and cross-linking said resin.

4. The method claimed in claim 3 wherein said resin is a polyimide charged with silver.

5. An electrical connection made by the method as claimed in claim 1 wherein said terminal is a rivet having a neck.

6. An electrical connection made by the method as claimed in claim 1 wherein said terminal is a flat washer having a central orifice.

7. The connection claimed in claim 5 wherein said electrically conductive material layer to which said terminal is glued is a resistive track forming a heating element.

8. A combination of the connection as claimed in claim 5 applied to a heating plate for a heating receptacle.

9. The method of making a glued electrical terminal connection using an electrically conductive glue comprising at least the following steps:

a) making a series of lamellae in at least one substantially plane area of a rigid terminal made from an electrically conductive material;

b) covering said area provided with said lamellae with said electrically conductive glue; and c) applying said area provided with said lamellae to a conductive material layer to effect said gluing.

10. The method claimed in claim 9 wherein each of said lamellae has a width of not more than 1 mm.

11. The method claimed in claim 9 wherein said glue is an electrically conductive thermostable resin and further including an additional step of drying and cross-linking said resin.

12. The method claimed in claim 11 wherein said resin is a polyimide charged with silver.

13. A rigid terminal for use in the method as claimed in claim 9 including at least one plane wing forming a support adapted to be placed on said conductive material layer and a blade for making an electrical connection to external connection members and wherein each plane wing has a cut-out area wherein said lamellae are formed between said cut-outs.

14. The terminal claimed in claim 13 wherein said support has a central body raised relative to said conductive material layer and forming a bridge in order to stiffen said support of said terminal and two plane lateral wings each provided with a series of lamellae and said blade for making an electrical connection to external connection members is bent at 60° relative to said support.

15. The terminal claimed in claim 14 wherein said blade for making at least one electrical connection with external connection members is bent about an axis coincident with its pivot axis relative to said support.

16. The terminal claimed in claim 14 wherein said central body has a cut-out adjacent said blade for making an electrical connection to external connection members in order to limit effects of expansion when said terminal is subjected to an increase in temperature.

17. A combination of the terminal as claimed in claim 13 applied to a heating plate for a heating receptacle wherein said layer of electrically conductive material to which said terminal is glued is a resistive track forming a heating element.

18. The method of claim 1 or 9 wherein said terminal comprises a rivet having a neck.

19. The method of claim 1 or 9 wherein said terminal comprises a flat washer having a central orifice.

20. The method of claim 18 wherein said electrically conductive material layer to which said terminal is glued is a resistive track forming a heating element.

21. The method of claim 18 wherein said glued electrical connection is made to a heating plate for a heating receptacle.

22. The method of claim 9 wherein the terminal comprises at least one plane wing forming a support adapted to be placed on said conductive material layer and a blade for making an electrical connection to external connection members and wherein each plane wing has a cut-out area wherein said lamellae are formed between said cut-outs.

23. The method of claim 22 wherein said support has a central body raised relative to said conductive material layer and forming a bridge in order to stiffen said support of said terminal and two plane lateral wings each provided with a series of lamellae and said blade for making an electrical connection to external connection members is bent at 60° relative to said support.

24. The method of claim 23 wherein said blade for making at least one electrical connection with external connection members is bent about an axis coincident with its pivot axis relative to said support.

25. The method of claim 23 wherein said central body has a cut-out adjacent said blade for making an electrical connection to external connection members in order to limit effects of expansion when said terminal is subjected to an increase in temperature.

26. The method of claim 22 wherein said layer of electrically conductive material to which said terminal is glued is a resistive track forming a heating element on a heating plate for a heating receptacle.

27. The combination as claimed in either claim 8 or 17 wherein the heating receptacle is a kettle.

* * * * *